R. E. HELLMUND.
INDUCTION MOTOR.
APPLICATION FILED JUNE 22, 1907.

1,011,783.

Patented Dec. 12, 1911.
7 SHEETS—SHEET 2.

Witnesses:
Geo. C. Larson
Alfred H. Moore

Inventor
R. E. Hellmund.
By Barton, Tanner & Falk
Attys.

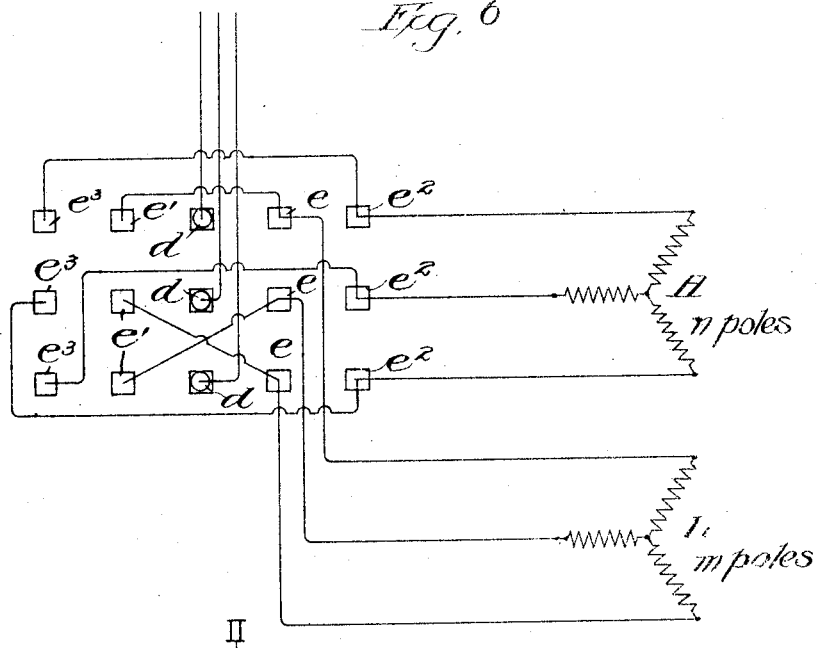
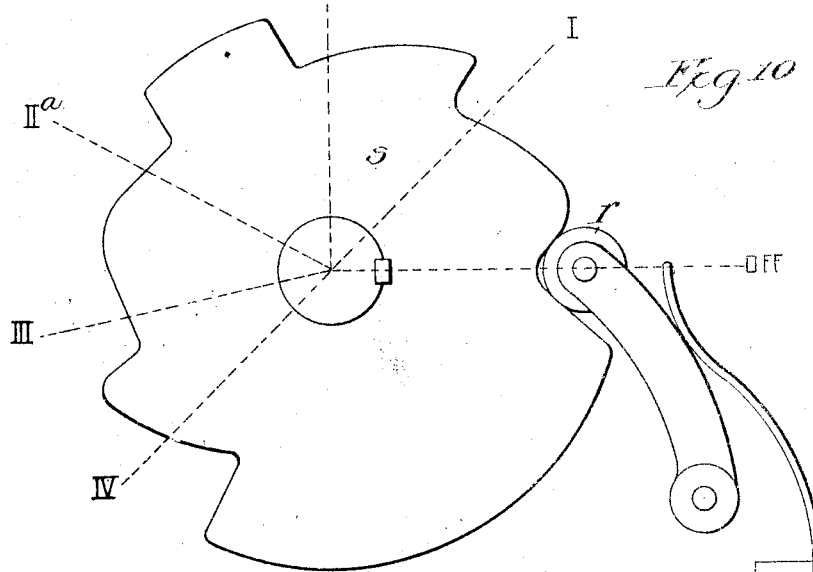

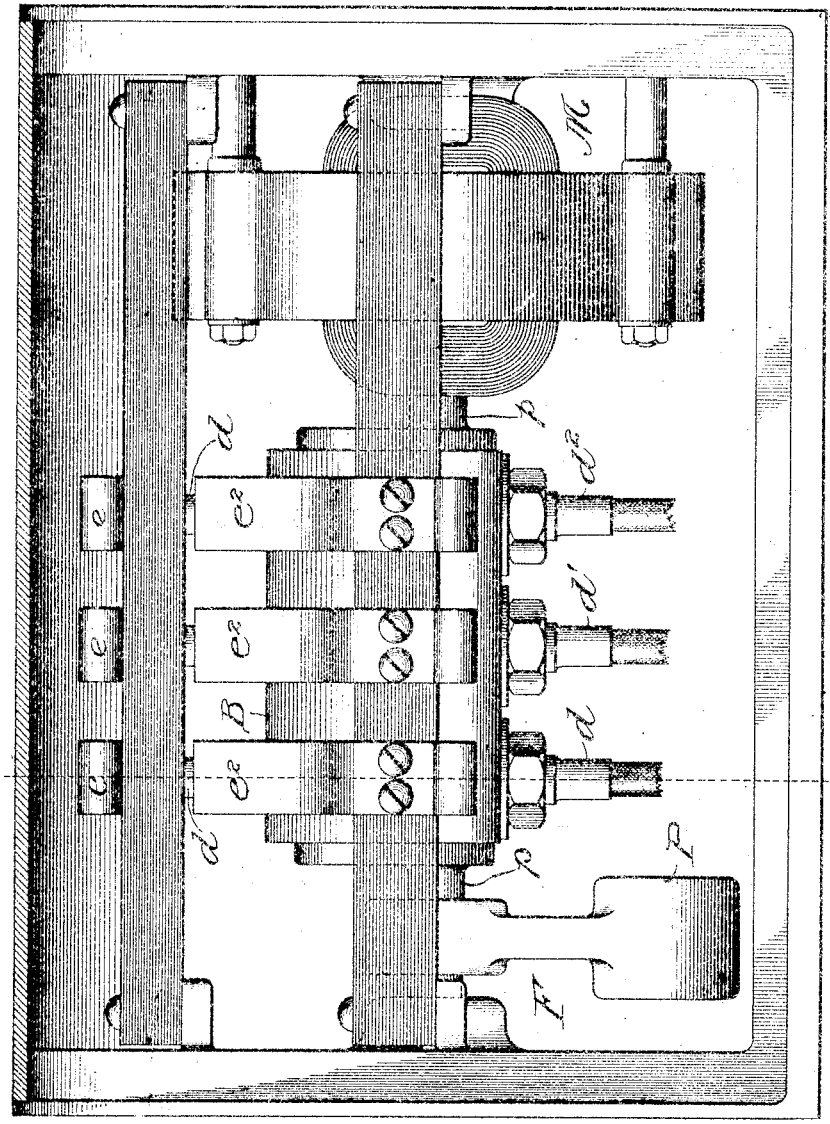

R. E. HELLMUND.
INDUCTION MOTOR.
APPLICATION FILED JUNE 22, 1907.
1,011,783.
Patented Dec. 12, 1911.
7 SHEETS—SHEET 7.
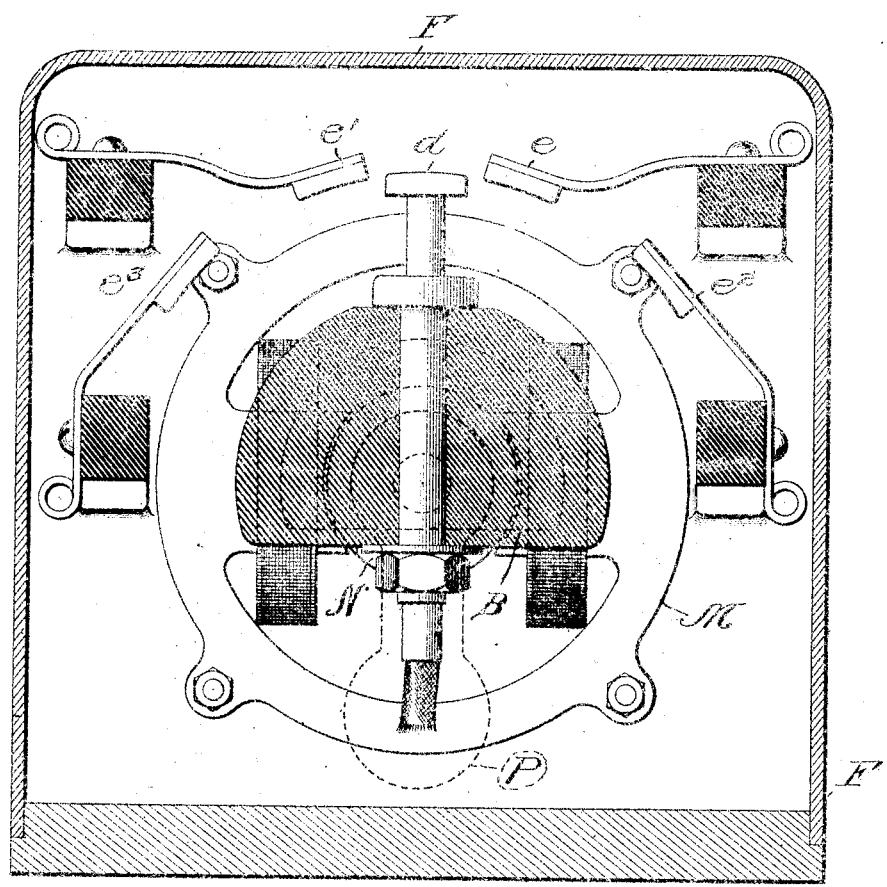
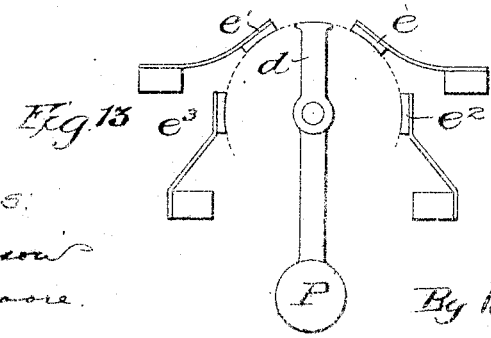

UNITED STATES PATENT OFFICE.

RUDOLF E. HELLMUND, OF HINSDALE, ILLINOIS, ASSIGNOR, BY MESNE ASSIGNMENTS, TO GENERAL ELECTRIC COMPANY, A CORPORATION OF NEW YORK.

INDUCTION-MOTOR.

1,011,783. Specification of Letters Patent. Patented Dec. 12, 1911.

Application filed June 22, 1907. Serial No. 380,349.

*To all whom it may concern:*

Be it known that I, RUDOLF E. HELLMUND, citizen of the United States, residing at Hinsdale, in the county of Dupage and State of Illinois, have invented a certain new and useful Improvement in Induction-Motors, of which the following is a full, clear, concise, and exact description.

My invention relates to induction motors, and its object is to provide means for controlling the operation of variable speed motors of this type.

My invention contemplates an induction motor having two or more sets of windings, so as to produce different numbers of poles, in combination with switching means adapted to bring the different sets of windings successively into circuit. This gives the rotor a speed corresponding to whichever of the windings is energized.

One feature of my invention consists in locating the electrically independent windings in the same stator slots, each winding, however, embracing a different number of slots to produce the different numbers of rotating magnetic poles. The high speed windings are preferably located in the bottom of the slots, with the low speed windings at the top, since the tendency of magnetic leakage from the low speed windings is decreased by reason of their location in proximity to the rotor.

A further feature of my invention consists in an arrangement whereby, in starting, the low speed winding is switched into service before the high speed winding, thereby obtaining favorable starting conditions.

A further feature consists in an arrangement for controlling the current to the motor windings in such manner that in stopping the motor the windings are brought into circuit in successive order from the high speed down to the low speed. In this arrangement the switching of the low speed winding into service causes a braking effect by reason of the running of the rotor at a speed above the normal low speed. The motor running above synchronism acts as a generator, and current is returned to the main circuit, preferably through an autotransformer, which steps up the voltage so that the return current is not excessive. The advantage of this is that it prevents undue variations in the average current in the main circuit.

A further feature of my invention consists in means for overcoming the remaining inertia produced by the low speed winding, in stopping the motor. This may be done by momentarily reversing one of the phases of the low speed winding. For this latter purpose an automatic controller switch is provided, having means, such as a pendulum, to swing the controller momentarily to the reverse position in stopping, so as to produce increased braking torque between the low speed and zero.

These and other features of my invention may be more readily understood by reference to the accompanying drawings, in which—

Figure 1 is a diagram of a circuit for a two phase, two speed motor; Fig. 2 is a similar diagram of a motor adapted to rotate in either direction; Fig. 3 is a diagram of the circuit arrangement of a two phase, two speed motor with an autotransformer; Fig. 4 is a diagram similar to that shown in Fig. 3, but in which the motor in stopping is switched directly from full voltage high speed winding to the low speed winding at partial voltage; Fig. 5 is a diagram corresponding to Fig. 3, for a three phase, three speed motor; Fig. 6 is a diagram of a two speed, three phase motor in which the movable contacts are electrically connected to the mains; Fig. 7 is a diagram of the stator of a two phase motor wound to produce 6 and 12 poles respectively; Fig. 8 shows the characteristic curve of the current for a three speed motor without an autostarter; Fig. 9 is a diagram showing the torque corresponding to the current illustrated in Fig. 8; Fig. 10 is a diagram of a star wheel used in connection with the circuit arrangement illustrated in Fig. 4; Fig. 11 is a side elevation, with a portion of the cover removed, of the switching mechanism forming part of my invention, and especially adapted for use in connection with the circuit arrangement shown in Fig. 6; Fig. 12 is a section on the line 13—13 of Fig. 11; and Fig. 13 is a diagram of the means for swinging the controller momentarily to the reverse position in stopping.

Similar letters of reference designate similar parts throughout all the figures.

Referring to the drawings, H and L represent the high and low speed windings, respectively, and in Fig. 5, which shows a three speed motor, I represents a winding for producing a speed intermediate the other two windings.

In the several views the switching mechanism is illustrated in off position.

Referring to Fig. 1, when the movable contacts, $a$, $a^1$, are moved to the right in the first position, so as to bridge the fixed contacts $b$ and $c$, and $b^1$ and $c^1$, phases A and B, respectively, are connected to the low speed winding L. By a still further movement of contacts $a$, $a^1$, the fixed contacts $b$ and $c^2$ and $b^1$ and $c^3$ are bridged so as to switch in the high speed winding H. Fig. 2 illustrates substantially the same manner of connecting the mains to the high and low speed windings, said figure also showing means for reversing the direction of rotation by moving the movable contacts $a$ $a^1$, to the left of their normal or off position.

Fig. 3 illustrates an autotransformer T employed in connection with my invention. With such arrangement, when the movable contacts $a$, $a^1$, $t$, $t^1$, are moved to position I, phases A and B are connected to the low speed winding L through the autotransformer T with only part voltage of the mains. When said movable contacts are in position II the low speed windings receive full voltage of the line; in position III the high speed windings H are switched in circuit through the transformer, receiving only part voltage; and in position IV said high speed windings receive full voltage of the line. It will be observed that in all operating positions the autotransformer is bridged across the line, for reasons hereinafter described.

Fig. 4 shows an arrangement similar to that shown in Fig. 3, except that intermediate positions II and III, an additional position II$^a$ is provided. In the forward movement, in bringing the motor up to speed the movable contacts do not rest in position II$^a$. However, in the reverse movement to stop the motor, said contacts move from position IV to II$^a$ and from II$^a$ to off position. In position II$^a$ the low speed windings L are in circuit with only partial voltage of the line. This change from high speed with full voltage to low speed with partial voltage causes the motor to run above synchronism, said motor thereby acting as a generator and returning current through the transformer T to the main circuit. As before stated, the advantage of this is that it prevents undue variation in the average current in the main circuit.

In Fig. 10 I have illustrated a star wheel particularly adapted for use in connection with the structure illustrated in Fig. 4. As shown therein the periphery of the star wheel $s$ is such that the roller $r$ in the forward movement of the wheel rides over the elevation separating positions II$^a$ and III, but in the return movement is adapted to ride out of all positions except II$^a$, stopping at the latter position only.

Fig. 6 illustrates an arrangement similar to that shown in Fig. 2, but differing therefrom in that the mains are shown as electrically connected to movable contacts $d$, and a three phase current is employed.

Figure 1:
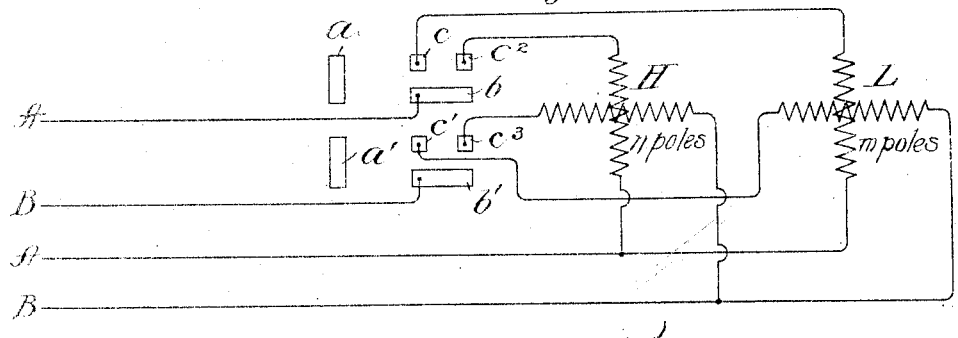
Figure 2:
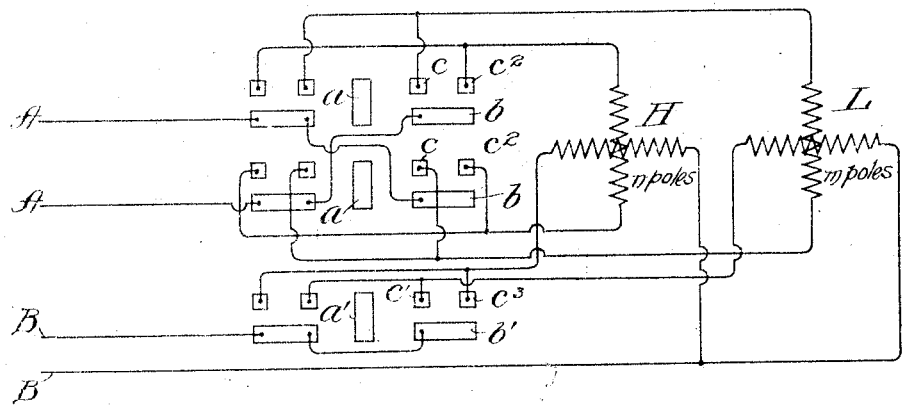
Figure 3:
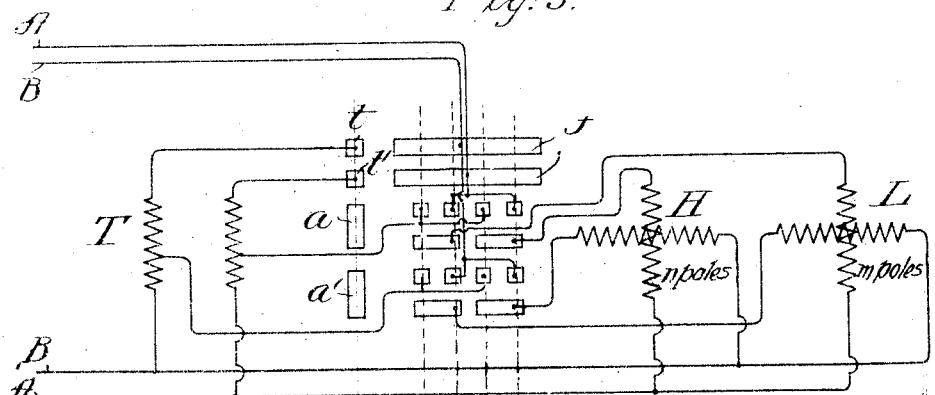
Figure 4:
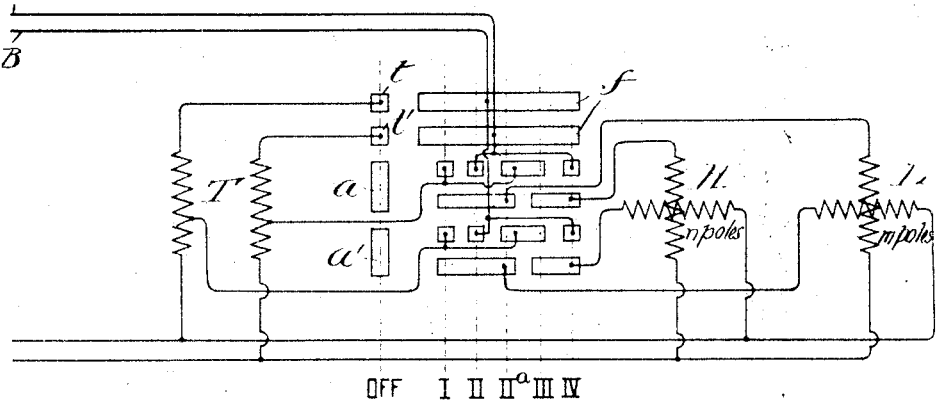
Figure 5:
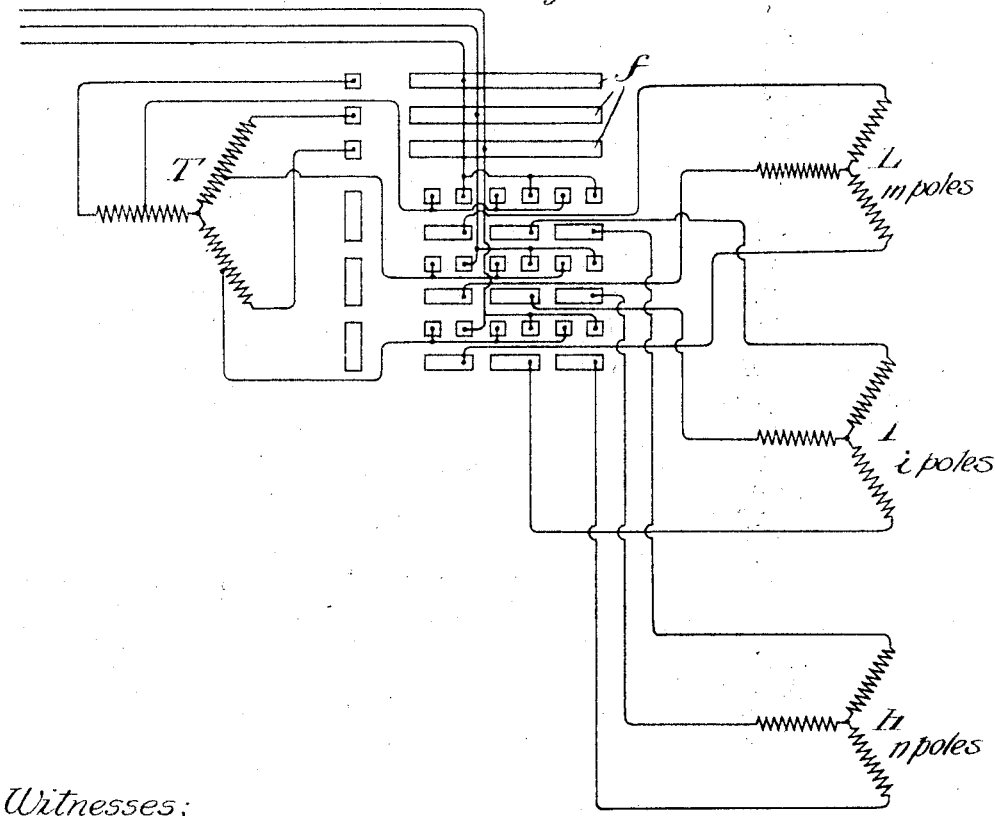
Fig. 5 is a diagram somewhat similar to that shown in Fig. 1, but illustrating low, intermediate and high speed windings L, I and H, respectively, in connection with a three phase system.
Figure 7:
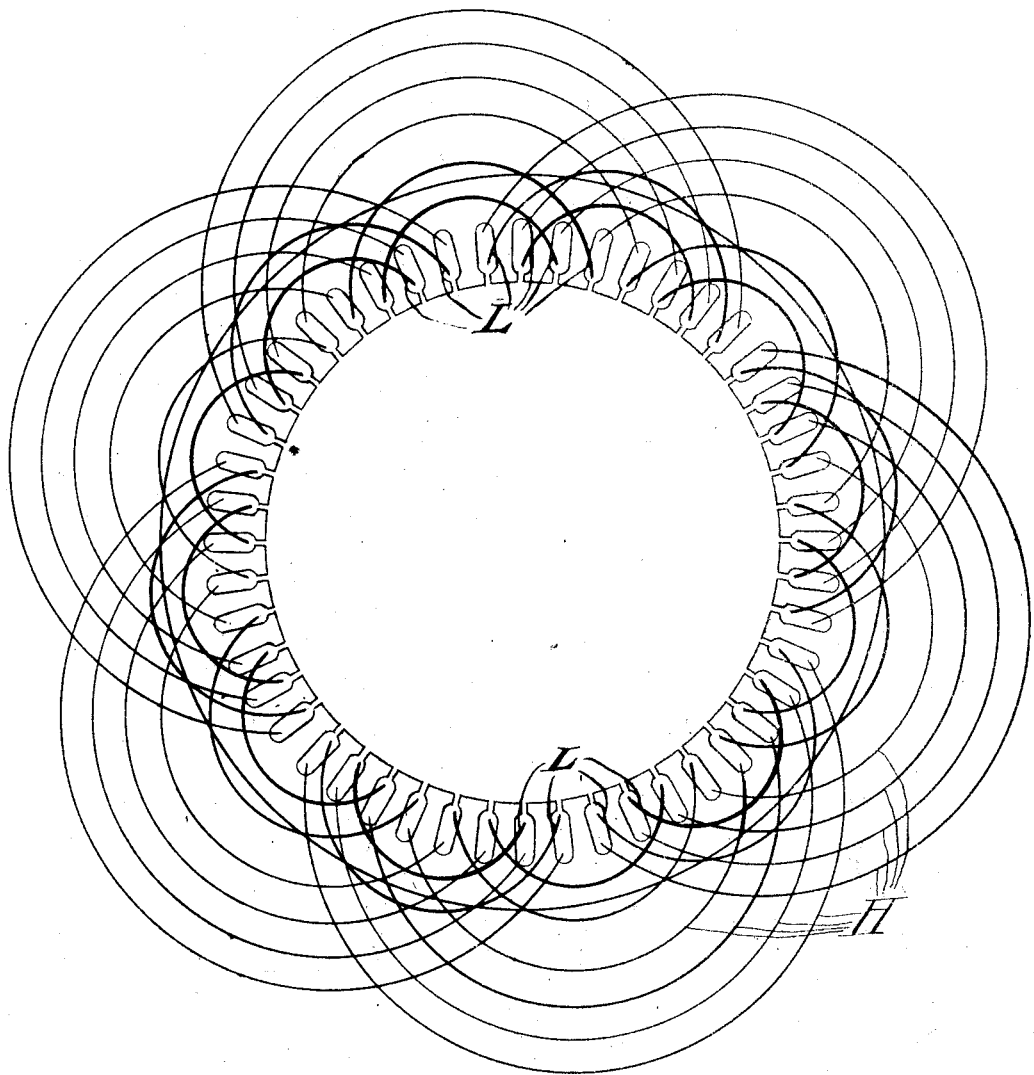

Referring to Fig. 7, I have illustrated as typical of the system of winding which forms a feature of my invention, a stator for a two phase system having two sets of windings adapted to produce six or twelve poles, according to which set of windings are energized. The low speed windings L are shown in the diagram in position to indicate their location in the top part of the usual slot, since there is a greater tendency of magnetic leakage from the low than from the high speed winding, and this arrangement, as hereinbefore stated, tends to overcome this magnetic leakage.

The motor may be braked, as hereinbefore stated, by momentarily reversing the motor. Mechanism for automatically accomplishing this purpose is shown in Figs. 11, 12 and 13, said figures showing a controller especially applicable to the circuit arrangement shown in Fig. 6. The movable contacts $d$ are carried by a wooden controller drum B, having pivot extensions $p$, $p$, provided with suitable bearings in the frame F. The engagement of said movable contacts with the fixed contacts $e$ and $e^1$, respectively, control the forward and reverse connection of the low speed windings to the mains. Likewise contacts $e^2$, $e^3$, control the flow of current through the high speed windings. The drum may be operated in any well known manner, as for example, by means of an electric dynamometer or motor having an armature N and a field magnet M, as clearly seen in Figs. 12 and 13 of the drawing. The armature and field windings of the motor are connected up in the well known manner. Moving with the controller drum is a pendulum like weight P which acts as a counter-torque for the motor. The greater the current supplied the armature of the motor the greater the torque developed by it, and consequently the greater the angle through which it moves. By varying the amount of current supplied the armature N, the angle through which it moves may be varied, and by varying the direction of flow through the armature N, the direction in which it moves may be reversed so that any of the stationary contacts $e$, $e^2$, $e^1$, or $e^3$ may be engaged by the movable contacts $d$. The inertia of said weight P swings the controller momentarily to the reverse position in stopping. For example, if the movable contacts d are in engagement with the fixed contacts e and the drum B is released, the weight P causes said movable contacts to momentarily engage contacts $e^1$, thus reversing the current through the low speed windings and causing the braking torque.

Figure 8:
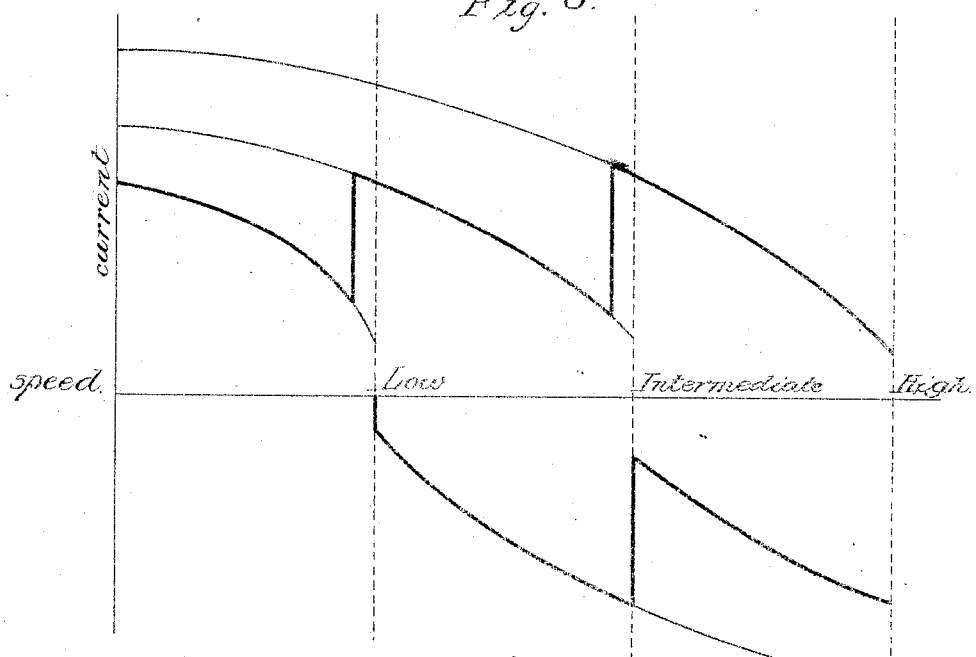
Figure 9:
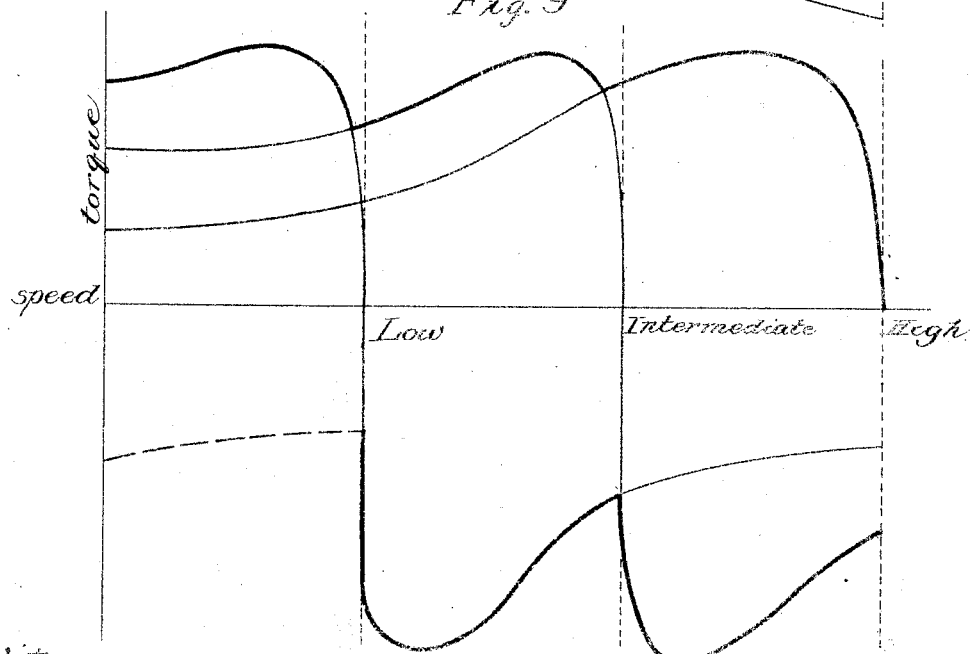

The starting torque, as well as the starting current, will be practically constant during the periods of starting. These conditions are illustrated in Figs. 8 and 9, which show in heavy lines the characteristic curves for the current and the torque, respectively, where windings for three speeds are employed without an autostarter. It will be noted that in starting, by passing successively from the low through the intermediate to the high speed windings, the starting torque is high, while the current is comparatively low, and both the current and the torque are practically constant, thus providing the most favorable starting conditions. The lower curve in Fig. 8 indicates the current given to the line while passing in a reverse direction from the high to the low speed winding. Likewise the heavy curve below the line in Fig. 9 indicates the braking or counter torque obtained in stopping, and the dotted curve indicates the braking torque obtained if the reversing scheme shown in Fig. 6, for example, be employed.

The rotor forming a part of my motor may be of the usual squirrel-cage type, and hence a description and showing of the same is unnecessary.

My invention provides a variable speed motor, since a speed of rotation can be obtained corresponding to the winding energized. Furthermore, as before stated, when it is desired to stop the motor, the windings are brought into circuit in successive order from the high speed down to the low speed. As a result the rotor is electrically braked within itself by means of the back torque on the rotor. This is due to the fact that when the winding which gives the rotor the speed at which it is running is cut out and the winding for the next speed is cut in, the rotor will be running at a speed which is over-synchronous with respect to this latter winding, and consequently a braking action will take place until the speed of the rotor has fallen to a speed corresponding to the latter winding. This operation takes place at each step until the low speed winding has been reached, and the rotor will then have only a small proportion of the inertia it had when running at the higher speed. This remaining inertia may be overcome in either of the two ways hereinbefore described.

With the motor of my invention, the following advantages may be obtained: variable speed; considerable improvement in the starting conditions; very effective electric braking down to low speed and efficient braking down to zero; and high efficiency for all speeds.

Having described my invention, I claim:

1. In a control system for an alternating current motor, the combination with a plurality of sets of windings for producing different speeds, of a controller adapted to connect said sets of windings in circuit in successive order from low speed to high speed to start said motor and to cut said sets of windings out of circuit in successive order from high speed to low speed to stop said motor, and means carried by said controller adapted to cause said controller to connect in circuit the low speed winding in one direction after all of the windings in the opposite direction have been cut out of circuit from high speed to low speed to stop said motor.

2. In a control system for an induction motor, the combination with a plurality of windings adapted to produce different speeds in either direction, of a controller adapted to connect said windings in circuit in either direction in successive order from low to high speed for starting said motor and to cut said windings out of circuit in the reverse order for stopping said motor, and means carried by said controller for carrying it past its off position in cutting out the windings to normally connect the low speed winding for the opposite direction of rotation to cause said windings to exert a braking force to stop the motor.

3. In a control system for an alternating current motor, the combination with a plurality of windings adapted to produce rotating magnetic fields of different speeds, of a controller for cutting said windings out of a circuit in successive order from high speed to low speed to cause said windings to exert a braking effort on said rotor, and means adapted to cause said controller to automatically reverse the low speed winding after all of the windings have been cut out.

In witness whereof, I, hereunto subscribe my name this 15th day of April, A. D., 1907.

R. E. HELLMUND.

Witnesses:
GEORGE E. FOLK,
ALFRED H. MOORE.